March 21, 1961  G. A. DAINES  2,976,035
FILAMENT CONVEYOR
Filed May 26, 1958  6 Sheets-Sheet 1
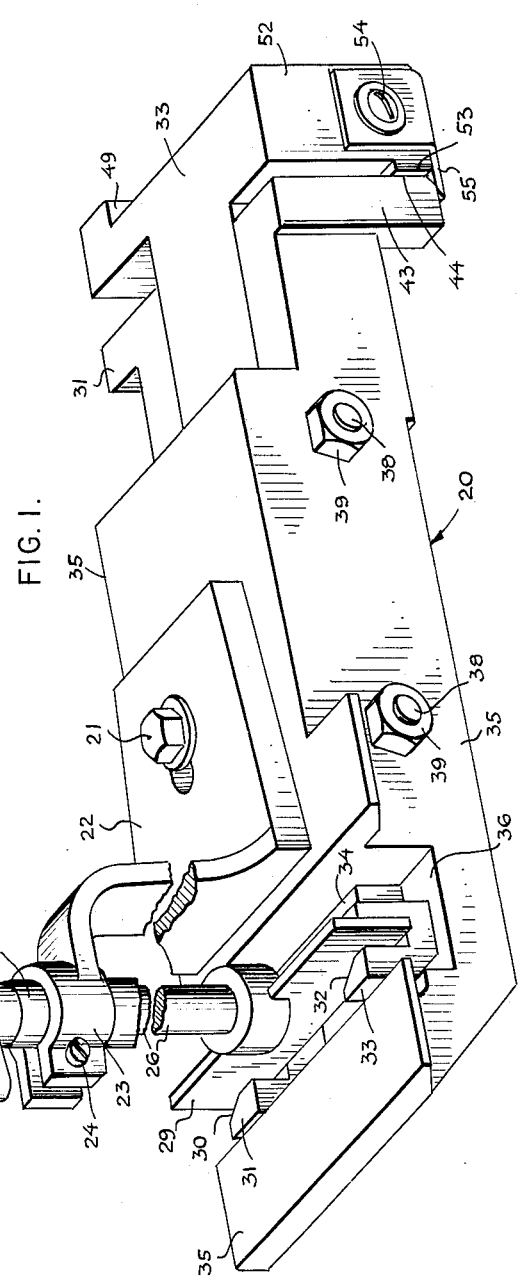
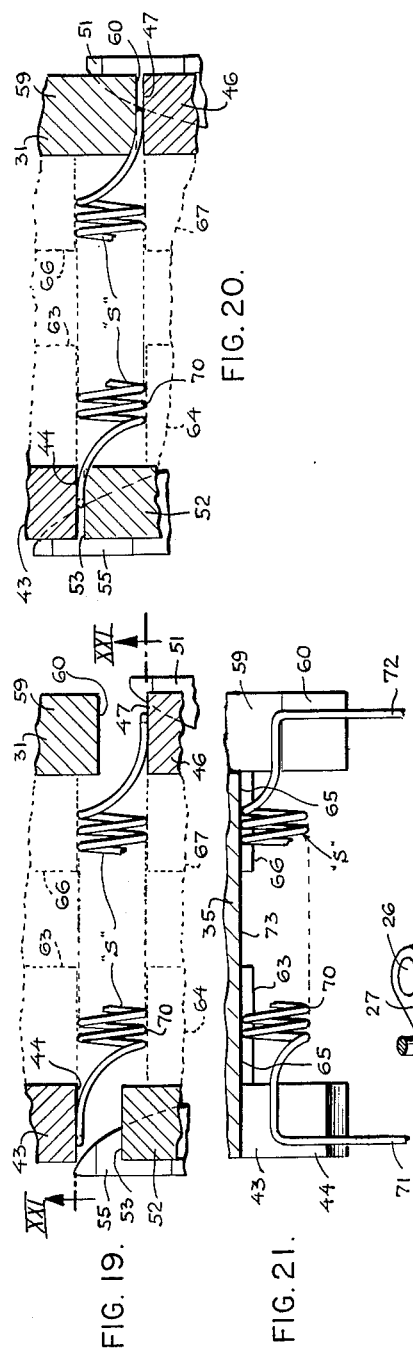
INVENTOR
GEOFFREY A. DAINES
BY 
ATTORNEY.

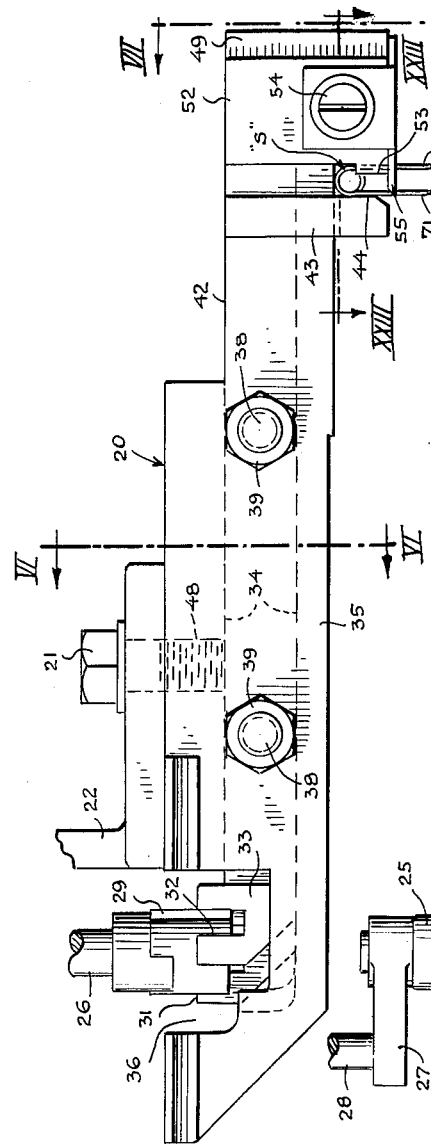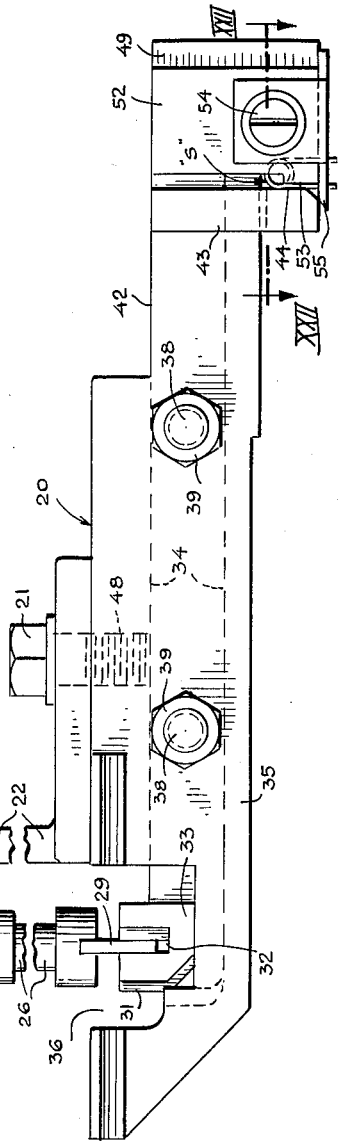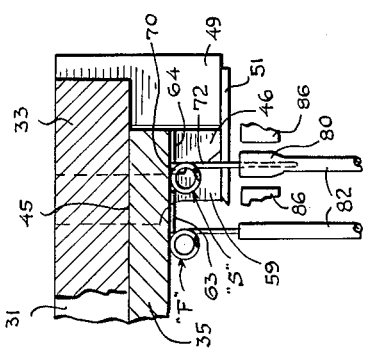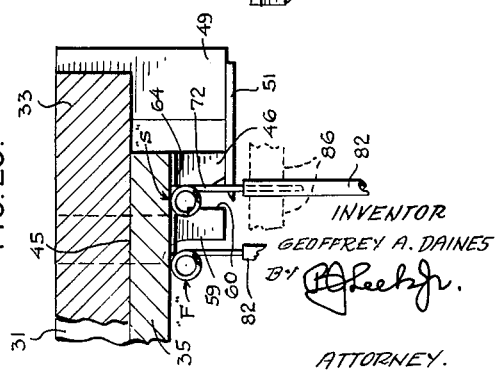

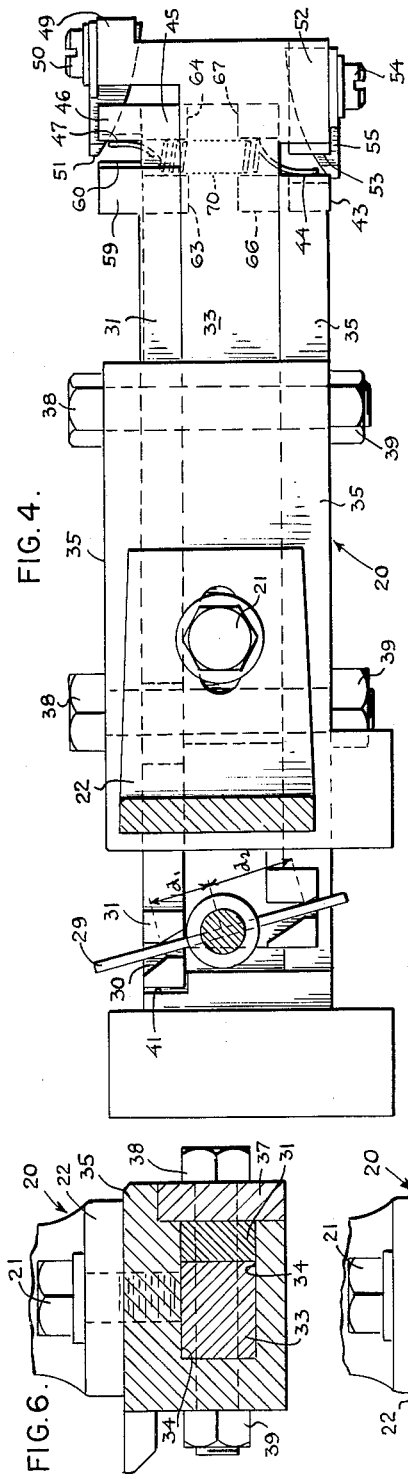

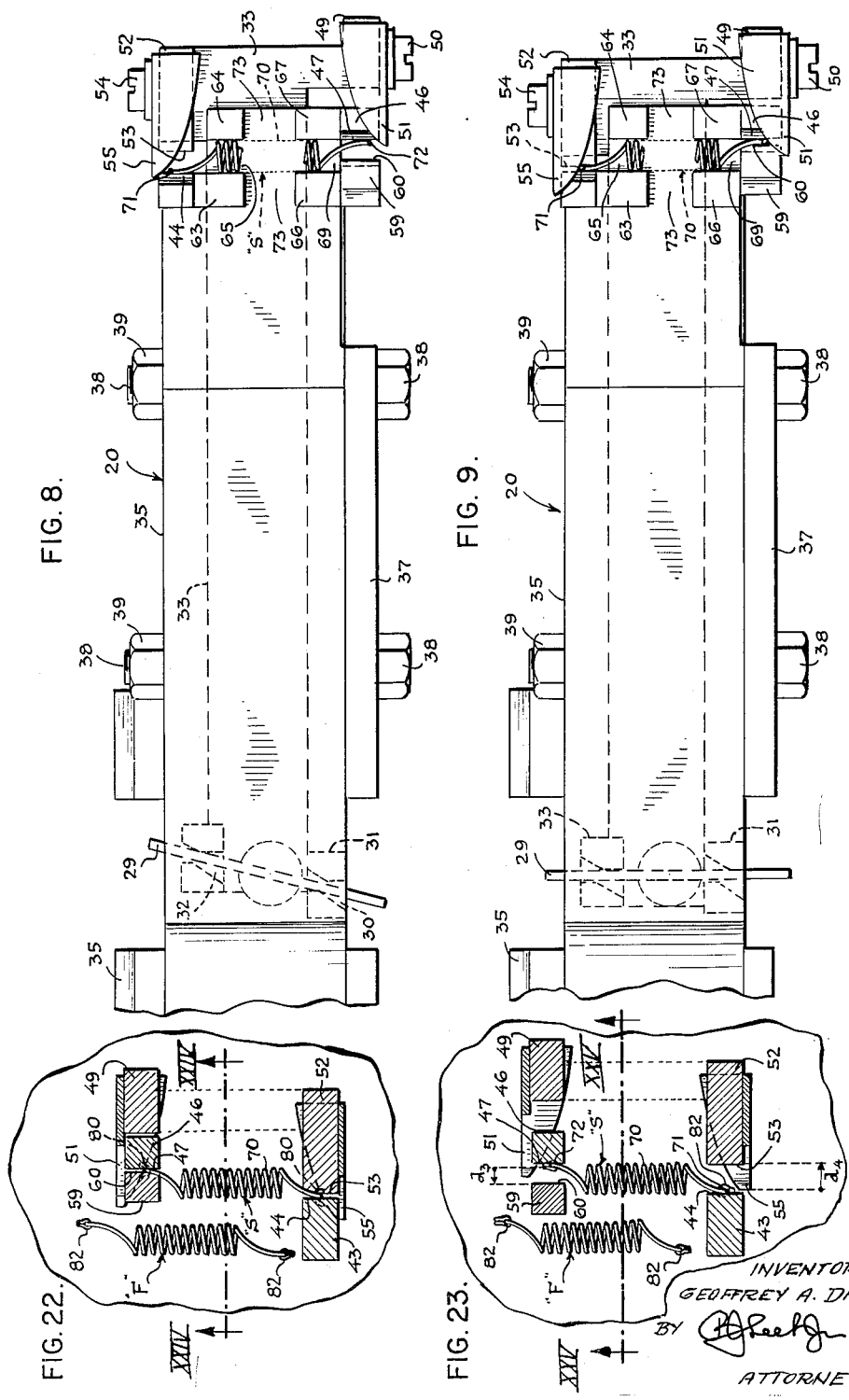

March 21, 1961  G. A. DAINES  2,976,035
FILAMENT CONVEYOR
Filed May 26, 1958  6 Sheets-Sheet 5
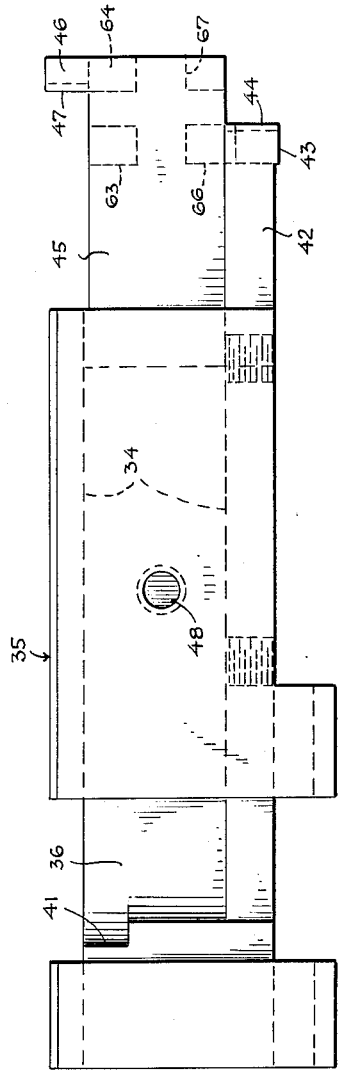
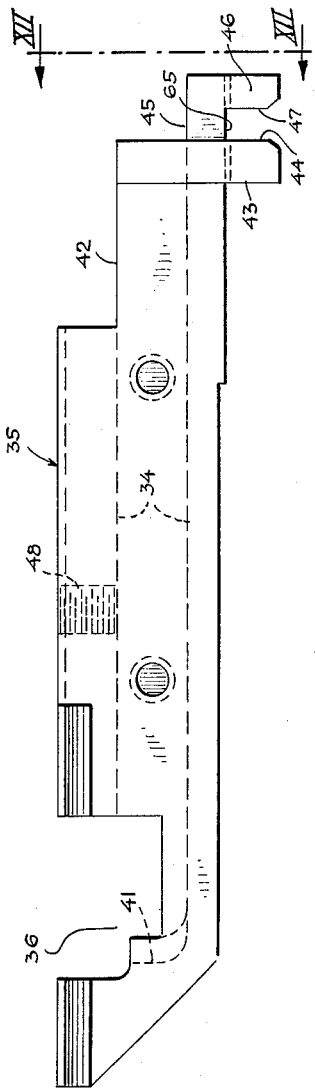
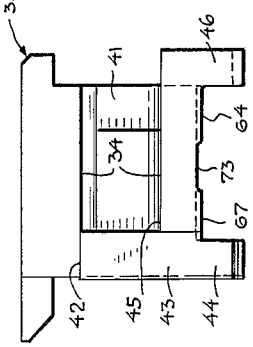
INVENTOR
GEOFFREY A. DAINES
BY
ATTORNEY.

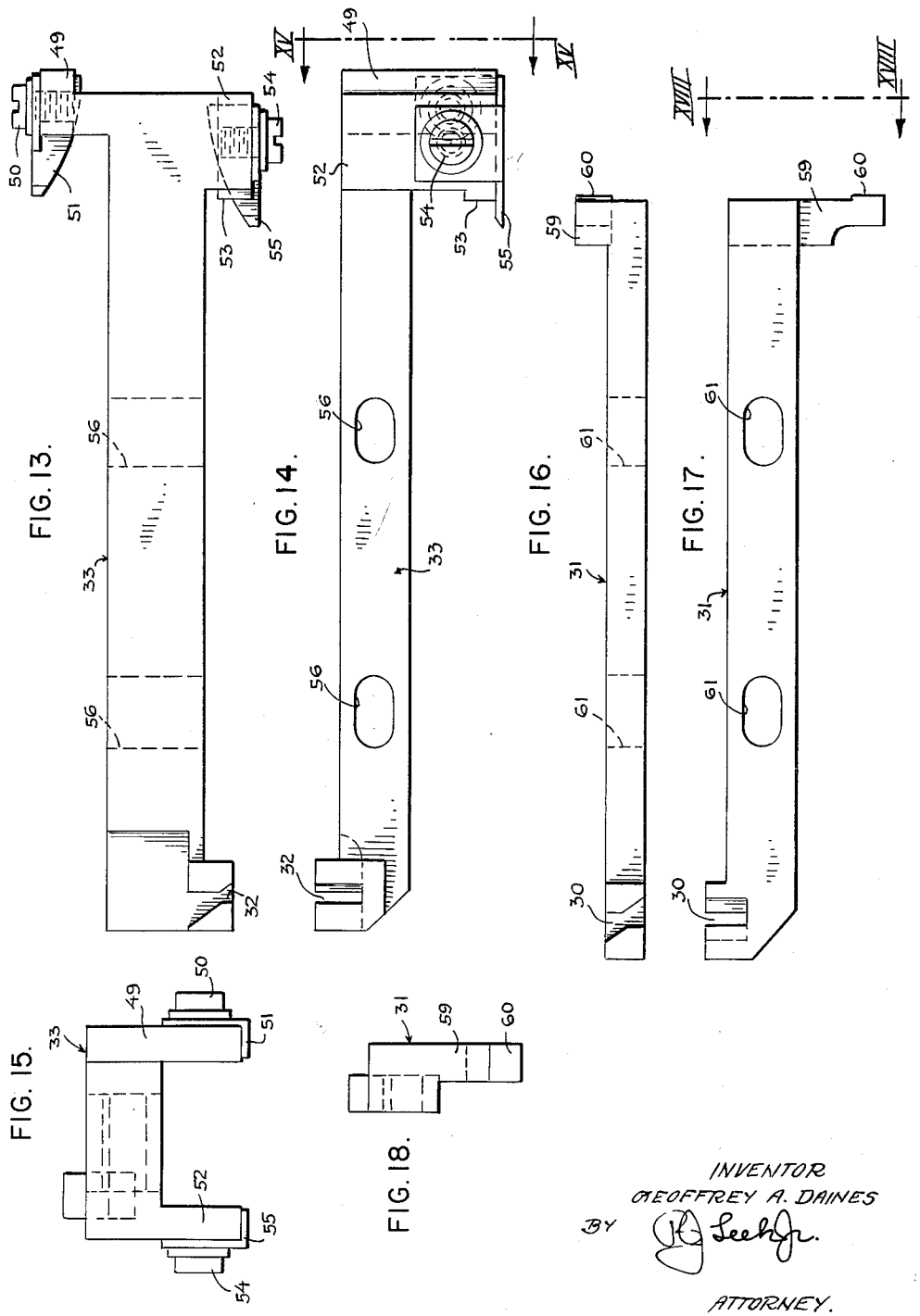

United States Patent Office 2,976,035
Patented Mar. 21, 1961

2,976,035

FILAMENT CONVEYOR

Geoffrey A. Daines, West Caldwell, N.J., assignor to Westinghouse Electric Corporation, East Pittsburgh, Pa., a corporation of Pennsylvania Filed May 26, 1958, Ser. No. 737,715

13 Claims. (Cl. 269—189)

This invention relates to the manufacture of incandescent lamps, such as sealed-beam automobile headlights, and relates more particularly to a filament conveyor utilized in the mounting in such lamps of filaments which have to be accurately positioned.

The usual automobile headlight has two filaments, a high-beam filament, and a low-beam filament. Machines for automatically mounting such filaments in such headlights are in common use. Such a machine is disclosed in U.S. Patent No. 2,297,950 issued Oct. 6, 1942, to J. Flaws, Jr. In such a machine, it is usual to have a separate conveyor for each of the two filaments of a headlight, each conveyor picking up a filament from an adjacent filament-loading turret, then conveying the filament over a lamp-reflector assembly held in a head of the filament-mounting machine, then lowering the filament so that the ends of its legs are located in preformed notches provided in the filament lead wires, and finally holding the filament in position on its lead wires while the filament legs are being clamped to the lead wires.

Heretofore, the two filaments of a headlight, and their lead wires have been so positioned that similar, conventional filament conveyors of the type shown in U.S. Patent No. 2,297,950 could be used for mounting both filaments. Certain new types of headlights now being manufactured have their filaments and filament lead wires so arranged that if a conventional filament conveyor was used to mount the second filament, the first mounted filament would be knocked out of position by the conveyor of the second filament. In addition, since the movable jaws of the conventional filament conveyors are mounted on the same operating member equal positive gripping of the legs of the filament is not always obtained. Further, due to the inability of the filament manufacturer to provide uniformity in the radius of the horizontal arcuate portion of each filament leg (connecting the coil body with the vertical portion of such leg) use of a fixed filament-leg gripping jaw adjacent the inner radial side of such arcuate portion (and contiguous to the first mounted filament) is prohibited, because frequent contact between the jaw and the arcuate portion (during pick-up of the filament from the filament-loading turret) misaligns the filament with resultant failure of the conveyor to pick up a filament.

It is the general object of the present invention to avoid and overcome the foregoing and other difficulties of and objections to prior art practices by the provision of an improved filament conveyor.

Another object of this invention is to provide a filament conveyor which will locate a second filament to be mounted in a lamp without disturbing a first mounted filament.

A further object of this invention is to provide a filament conveyor which will accurately locate the legs of a filament with respect to the lead wires of a lamp reflector assembly.

An additional object is to provide a filament conveyor which will provide individual control over the gripping action of the jaws thereof and thus insure an equal grip on each of the legs of the filament.

Another object is to provide a filament conveyor which avoids contact with the filament legs during the juxtaposition of the open filament-leg gripping jaws about the filament legs during the pick-up operation.

The aforesaid objects of the present invention and other objects which will become apparent as the description proceeds are achieved by providing a filament conveyor comprising a relatively long and relatively narrow body having (on one longitudinal end thereof) a pair of fixed filament-leg gripping jaws disposed on opposite sides of a filament-receiving pocket in the body, a pair of slides slidable within the body and each provided with a movable filament-leg gripping jaw, each movable jaw being adapted to cooperate with one of the fixed filament-leg gripping jaws to secure a filament leg therebetween, and resilient means for concurrently moving said slides to cause said movable jaws to move towards said fixed jaws and secure such filament legs therebetween with an equal grip.

For a better understanding of the invention, reference should be had to the accompanying drawings, wherein like numerals of reference indicate similar parts throughout the several views and wherein:

Fig. 1 is a perspective view of a filament conveyor of the present invention;

Fig. 2 is a side view of the filament conveyor with its filament-leg gripping jaws open;

Fig. 3 is a view similar to Fig. 2 but with the jaws closed;

Fig. 4 is a top plan view of the filament conveyor with the jaws open;

Fig. 5 is a view similar to Fig. 4 but with the jaws closed;

Fig. 6 is a vertical sectional view taken along the line VI—VI of Fig. 2 in the direction of the arrows;

Fig. 7 is an end elevational view taken along the line VII—VII of Fig. 2 in the direction of the arrows;

Fig. 8 is a bottom plan view of the filament conveyor with its jaws open;

Fig. 9 is a view similar to Fig. 8 but with the jaws closed;

Fig. 10 is a top plan view of the body of the conveyor;

Fig. 11 is a side elevational view of Fig. 10;

Fig. 12 is an end elevational view taken along the line XII—XII of Fig. 11 in the direction of the arrows;

Fig. 13 is a top plan view of the center slide of the conveyor;

Fig. 14 is a side elevational view of Fig. 13;

Fig. 15 is an end elevational view taken along the line XV—XV of Fig. 14 in the direction of the arrows;

Fig. 16 is a top plan view of the side slide of the filament conveyor;

Fig. 17 is a side elevational view of Fig. 16;

Fig. 18 is an end elevational view taken along the line XVIII—XVIII of Fig. 17 in the direction of the arrows;

Fig. 19 is an enlarged fragmentary view looking down upon a filament about to be picked up and with its legs between the open jaws of the filament conveyor, and shows also the guides carried by the center slide of the filament conveyor in position to contact the legs of the filament when the jaws start to close;

Fig. 20 is a view similar to Fig. 19 but with the jaws closed about the filament legs, and with the guides having properly positioned the filament legs between the jaws;

Fig. 21 is a fragmentary vertical sectional view taken on the line XXI—XXI of Fig. 19 in the direction of the arrows and which is also identical to a line if taken at the same location in Fig. 20;

Fig. 22 is a fragmentary horizontal-sectional view taken along the line XXII—XXII of Fig. 3 in the direction of the arrows and showing the filament conveyor positioned above the reflector assembly preparatory for the filament-clamping operation;

Fig. 23 is a view similar to Fig. 22 and showing the filament conveyor after the filament legs have been clamped to the lead wires and the jaws of the filament conveyor have been opened preparatory for the retraction of the filament conveyor;

Fig. 24 is a fragmentary vertical-sectional view taken along the line XXIV—XXIV of Fig. 22 in the direction of the arrows;

Fig. 25 is a view similar to Fig. 24 taken along the line XXV—XXV of Fig. 23 in the direction of the arrows.

Although the principles of the present invention are broadly applicable for picking up a filament from a filament-loading turret associated with a filament-mounting machine and positioning the filament legs in preformed notches in the lead wires of a filament mount, the invention is particularly adapted for mounting a second of two filaments on the lead wires of a reflector assembly of a sealed-beam automobile headlight, and hence it has been so illustrated and will be so described.

Referring first to Figs. 1–9 of the drawings, a filament conveyor 20 of the present invention is attached to a bracket 22 by a screw 21 passing through the bracket 22 and engaging a threaded opening 48 in a body 35 of the conveyor 20 (Fig. 11). This bracket 22 has a bifurcated upper portion 23 clamped by a screw 24 around a sleeve 25 through which extends a rotary shaft 26. The upper end of the shaft 26 is attached to a crank-arm 27 carrying a pin 28 which is adapted to be attached to the piston rod of a conventional air cylinder (not shown). The lower end of the shaft 26, as viewed in Figs. 1, 2 and 3, is attached to a resilient member, suitably a spring steel vane 29, which extends within an angled slot 30 in the top of the left-hand end portion of a side slide 31 of the filament conveyor (Figs. 4 and 5), and within an angled slot 32 in the top of the left-hand end portion of a center slide 33 of the filament conveyor 20. The vane 29 is rotated by rotation of the crank-arm 27 and the shaft 26 to move the side slide 31 and the center slide 33, as will be hereinafter described.

The filament conveyor 20 has a body 35, shown in detail by Figs. 1, 10 and 11 and having a recess 36 in the top of its left-hand portion (Figs. 9 and 10) for receiving the grooved end portions of the slides 31 and 33, and the vane 29. A longitudinal channel or slot 34 extends completely through the remainder of the body from such recess 36. The "inner end" of the body 35 (as hereinafter referred to) means the end adjacent the recess 36, and reference hereinafter to the "outer end" is understood to mean the opposite end of the body. The slides 31 and 33 are slidable in the slot 34, their adjacent inner surfaces being in slidable contact. As shown most clearly by Figs. 6 and 7, one side of the slot 34 (the side at the right-hand side of the slide 31) is formed by the inner surface of a plate 37 attached by bolts 38 and nuts 39 to the body 35. Referring to Figs. 4, 5, 10 and 11, the body 35 has along the left-hand edge of the recess 36 near the bottom of the latter, a cut-out portion forming a stop 41 for limiting the back movement of the side slide 31. At its right-hand end, the body 35 (as viewed in Figs. 10 and 11) is of a reduced cross-section thus forming a flat surface 42 which is actually an extension of the top of the slot 34 to thereby decrease the total weight of the filament conveyor 20. At the outer end of this flat surface 42 the body is provided with a depending portion 43 which at its lower right-hand end froms a vertically depending stationary filament-leg gripping-jaw 44. The body 35 is still additionally decreased in cross-section or further stepped to form another flat surface 45 which constitutes an extension of the bottom of the slot 34 on which such slides 31 and 33 reciprocate. This flat surface 45 extends beyond the flat surface 42. Also, this flat surface 45 is provided with a lateral extension 46 of increased cross-section which accordingly depends downwardly below the bottom of the surface 45 and thus forms another vertically extending, stationary filament-leg gripping jaw 47.

The fixed jaws 44 and 47 are diagonally opposite each other, a plane passing through one jaw being parallel to and spaced longitudinally of the body 35 from a plane passing through the other jaw. Such fixed jaws 44 and 47 are spaced apart longitudinally of the body 35 so as to accurately contact opposite filament legs 71 and 72 of a filament S, which filament legs are spaced apart the same distance as the spacing between the fixed jaws 44 and 47. It will be apparent from a consideration of Figs. 22 and 23 that the fixed jaws 44 and 47 are disposed diagonally opposite to each other so that such jaws are substantially parallel to a tangent to the curvature of the horizontal arcuate portion of the filament legs 71 and 72, thereby preventing contact between the filament legs and the fixed jaws during the positioning of such fixed jaws preparatory for the pick-up operation. The jaws portions 43 and 46 are beveled near the bottoms of the fixed jaws 44 and 47 respectively, to guide filament legs 71 and 72 which may be slightly misplaced, between the fixed jaws 44 and 47. Such fixed jaws 44 and 47 (Figs. 8 and 9) cooperate with movable jaws 53 and 60 on the side slide 31 and the center slide 33 respectively, as will now be described.

As viewed in Figs. 13 and 14, the center slide 33 has at one side of its right-hand end portion (the upper side of Fig. 13), an outwardly extending portion 49, to the upper end of which is attached by a screw 50, a cam-shaped filament-leg guide 51. At the opposite side of its right-hand end portion the center slide 33 has an outwardly extending jaw portion 52 having a vertically depending movable filament-leg jaw 53 near the bottom of its left-hand side. The jaw portion 52 also has attached thereto by a screw 54, another cam-shaped filament-leg guide 55. To permit longitudinal movement of the center slide 33 with respect to the body 35 by the vane 29, the center slide 33 is provided with clearance openings 56 for the bolts 38, which secure the side plate 37 to the body 35.

As shown most clearly by Figs. 16–18, the side slide 31 has at its right-hand end, a downwardly extending jaw portion 59 having at its right-hand end near its bottom, a vertically extending surface forming a movable filament-leg jaw 60. The side slide 31 has clearance openings 61 for the aforesaid bolts 38, the openings 61 being shaped to permit longitudinal movement of the side slide 31 (with respect to the body 35) by the vane 29.

The bottom of the body 35 has, as most clearly shown by Figs. 8 and 9 and 19–21, a pair of spaced-apart, oppositely disposed, rectangular-shaped portions 63 and 64 which extend slightly below the bottom of the body 35, and which form therebetween a recess 65. The body also has another pair of spaced-apart, oppositely disposed, rectangular-shaped portions 66 and 67 which extend slightly below the bottom of the body 35, and which form therebetween a recess 69 having the same width as, and aligned with, the recess 65. The aligned recesses 65 and 69 form a longitudinal pocket for receiving and locating the top portion of the body 70 of the filament "S" to be picked up by the filament conveyor 20. The downwardly extending rectangular-shaped portions 63 and 66 are spaced apart (as are the rectangular-shaped portions 64 and 67) to provide aligned, longitudinally extending recesses 73 which provide clearance for an upwardly extending ridge of a conventional filament holder on a filament-loading turret of the type shown in the above-mentioned U.S. Patent No. 2,297,950.

The fixed jaw 44 (Figs. 4 and 5) of the body 35 is opposite the movable jaw 53 of the center slide 33. The fixed jaw 47 of the body 35 is opposite the movable jaw 60 of the side slide 31.

The vane 29, when rotated by the shaft 26 in a counterclockwise direction (looking down on Figs. 1, 4 and 5), moves the side slide 31 to the left to move the movable jaw 60 carried thereby away from the fixed jaw 47 on the body 35, and moves the center slide 33 to the right to move the movable jaw 53 away from the fixed jaw 44 on the body 35, thus opening the filament-leg gripping jaws as shown in Figs. 2, 4, 8, 19, 23 and 25. During the opening of the jaws to release the legs of a filament "S" the stop 41 (Figs. 10 and 11) limits the movement of the side slide 31 to the left thereby preventing the jaw portion 59 from striking and displacing a first previously mounted filament F (Figs. 22–25).

The vane 29 (when rotated by the shaft 26 in a clockwise direction) moves the side slide 31 to the right to move its movable jaw 60 towards the fixed jaw 47 on the body 35, and moves the center slide 33 to the left to move its movable jaw 53 toward the fixed jaw 44 on the body 35, thus closing such jaws about the filament legs 71 and 72 positioned therebetween (Figs. 5 and 20). Because of its resilient nature the closing movement of the vane 29 insures equalized application of the jaw pressure on the filament legs 71 and 72.

As the slides 31 and 33 are moved by the vane 29 to close the filament-leg gripping jaws 44, 47, 53 and 60, the cam-shaped guides 51 and 55 carried by the center slide 33, contact the filament legs 71 and 72, as shown best by Figs. 8 and 9, and 19–22, and move the filament legs so that when the jaws close on the filament legs, the latter are properly positioned to enter preformed notches 80 (Figs. 22 and 24) provided for them in lead wires 82 of the lamp-reflector assembly. Figs. 2, 4, 8 and 19 show the guides 51 and 55 ready to contact the filament legs when the jaws start to close. Figs. 3, 5, 9 and 20 show the filament legs properly located by the guides when the jaws are closed.

The vane contacting sides of the angled slots 30 and 32 in the side and center slides 31 and 33, respectively, are so located distances $d_1$ and $d_2$ (Fig. 4) respectively from the pivot of the vane 29 that the center slide 33 carrying the leg locating guides 51 and 55, is moved a distance $d_4$ (Fig. 23) by the vane 29, which distance $d_4$ is about 1½ times the distance $d_3$, which the side slide 31 is moved by the vane. This provides adequate clearance between the filament legs 71 and 72 and the guides 51 and 55 when the conveyor 20 is lowered over a filament on the filament-loading turret to pick the filament up. At the same time the limitation of the movement of the side slide 31 to a lesser distance limits the possibility of movable jaw portion 59 striking the previously mounted filament F and the stop 41 restricts the total movement of both slides 31 and 33, thereby preventing such jaw portion 59 from striking the previously mounted filament F.

The filament conveyor 20 is designed to be used in a conventional filament-mounting machine of the type shown in the above-mentioned U.S. Patent No. 2,297,950 to mount a second filament S (Figs. 22–25) in an automobile headlight reflector assembly after a first filament F has been mounted in the reflector assembly by another filament conveyor (not shown). A conventional operating mechanism (not shown, but of the type shown in the above-mentioned U.S. Patent No. 2,297,950), causes the filament conveyor 20 and its associated air cylinder (not shown) to be moved downwardly (with the jaws 44, 47, 53 and 60 of the filament conveyor 20 open) over a filament S positioned on a conventional filament-loading turret (not shown) associated with the filament-mounting machine. At the end of this down travel, the filament S is located as shown by Figs. 2, 4, 8 and 19, with the upper portion of the body 70 of such filament S between the downwardly extending rectangular-shaped portions 63—64 and 66—67, and with the filament legs 71 and 72 between the open jaws 44, 47, 53 and 60 of the conveyor 20. Then, the operating mechanism (not shown) causes the air cylinder (not shown) of the filament conveyor 20 to be energized to rotate the resilient vane 29 in clockwise direction, as viewed in Figs. 1, 4 and 5, to move the side and center slides 31 and 33 to the right and left respectively with attendant closure of the jaws 44, 47, 53 and 60 of the filament conveyor 20 with equalized pressure about the legs 71 and 72 of the filament S, as shown by Figs. 3, 5, 9 and 20. Next, the operating mechanism causes the filament conveyor 20 and its air cylinder (not shown) to be moved upwardly above the filament-loading turret and be swung over the reflector assembly of an automobile headlight disposed in a head of the filament-mounting machine and then down to place the ends of the filament legs 71 and 72 in the preformed notches 80 (Figs. 22 and 24) in the upper ends of the lead wires 82 of the reflector assembly. A filament-clamping mechanism 86 (Figs. 24 and 25) of the type shown in the above-mentioned U.S. Patent No. 2,297,950 then clamps the notches 80 in the lead wires 82 about the legs 71 and 72 (Figs. 23 and 25), following which the operating mechanism causes the air cylinder of the filament conveyor 20 to rotate the vane 29 to move the side and center slides 31 and 33 respectively, to open the jaws 44, 47, 53 and 60 of the filament conveyor 20 (Figs. 23 and 25), and lifts the filament conveyor 20 from the reflector assembly so that it would be ready for the next cycle of operation.

While the filament conveyor 20 was designed to mount the second filament S in a reflector assembly of an automobile headlight, it could be used to mount the first filament F in such a reflector assembly, or for other purposes for which it is capable of being used.

It will be recognized by those skilled in the art that the objects of the present invention have been achieved by the provision of an improved filament conveyor which will locate a second filament to be mounted in the reflector assembly of a sealed-beam automobile headlamp without disturbing a first mounted filament. In addition, the filament conveyor of the present invention accurately locates the legs of the filament with respect to the lead wires of the reflector assembly, provides equalized gripping of the filament legs by the jaws of such filament conveyor and insures positive pick up of a filament from the filament-loading turret.

While in accordance with the patent statutes one best-know embodiment of the invention is illustrated and described in detail, it is to be particularly understood that the invention is not limited thereto or thereby.

I claim:

1. A conveyor for a filament having a coiled portion and legs extending from said coiled portion, said conveyor comprising a relatively long and relatively narrow body, said body having at one longitudinal side a first filament-leg gripping jaw, and having at its opposite side a second filament leg gripping jaw spaced longitudinally of said body from said first jaw, a pair of slides slidable within said body, one of said slides having a third filament-leg gripping jaw facing said first jaw, the other of said slides having a fourth filament-leg gripping jaw facing said second jaw, and means for concurrently moving said slides to move said third jaw towards said first jaw and said fourth jaw toward said second jaw to secure said legs in said jaws, or to move said third jaw away from said first jaw and said fourth jaw away from said second jaw to release said legs.

2. A conveyor for a filament having a coiled portion and legs extending from said coiled portion, said conveyor comprising a relatively long and relatively narrow body, said body having at one longitudinal side a first filament-leg gripping jaw, and having at its opposite side a second filament-leg gripping jaw spaced longitudinally of said body from said first jaw, a pair of slides slidable within said body, one of said slides having a third filament-leg gripping jaw facing said first jaw, the other of said slides having a fourth filament-leg gripping jaw facing said second jaw, and means for concurrently moving said slides to move said third jaw toward said first jaw and said fourth jaw toward said second jaw to secure said legs in said jaws, or to move said third jaw away from said first jaw and said fourth jaw away from said second jaw to release said legs, and one of said slides having attached thereto a pair of filament-leg locating guides shaped and located to move the legs of a filament inwardly toward the centers of said first and second jaws when said last mentioned slide is moved to move its jaw toward the jaw of the body it faces.

3. A filament conveyor having a relatively long, relatively narrow body, said body having at one end of one longitudinal side, a first filament-leg gripping jaw, and having adjacent the corresponding end of its opposite side, a second filament-leg gripping jaw spaced outwardly beyond said one end and facing the opposite end of said opposite side, a pair of slides slidable within said body, one of said slides having adjacent one end a third filament-leg gripping jaw facing said first jaw, the other of said slides having at its end corresponding to said end of said one slide a fourth filament-leg gripping jaw facing said second jaw, and means engaging said slides for moving said one slide to move said third jaw toward said first jaw and for moving said fourth jaw toward said second jaw, or to move said third jaw away from said first jaw and to move said fourth jaw away from said second jaw.

4. A filament conveyor having a relatively long, relatively narrow body, said body having at one end of one longitudinal side, a first filament-leg gripping jaw, and having adjacent the corresponding end of its opposite side, a second filament-leg gripping jaw spaced outwardly beyond said one end and facing the opposite end of said opposite side, a pair of slides slidable within said body, one of said slides having adjacent one end a third filament-leg gripping jaw facing said first jaw, the other of said slides having at its end corresponding to said end of said one slide a fourth filament-leg gripping jaw facing said second jaw, and means engaging said slides for moving said one slide to move said third jaw toward said first jaw and for moving said fourth jaw toward said second jaw, or to move said third jaw away from said first jaw and to move said fourth jaw away from said second jaw, and said one slide having attached thereto a pair of filament-leg locating guides shaped and located to move the legs of a filament inwardly toward the centers of said first and second jaws when said one slide is moved to move said third jaw toward said first jaw.

5. A filament conveyor having a relatively long, relatively narrow body, said body having at one end of one longitudinal side, a first filament-leg gripping jaw, and having adjacent the corresponding end of its opposite side, a second filament-leg gripping jaw spaced outwardly beyond said one end and facing the opposite end of said opposite side, a pair of slides slidable within said body, one of said slides having adjacent one end a third filament-leg gripping jaw facing said first jaw, the other of said slides having at its end corresponding to said end of said one slide a fourth filament-leg gripping jaw facing said second jaw, and means engaging said slides for moving said one slide to move said third jaw toward said first jaw and for moving said fourth jaw toward said second jaw, or to move said third jaw away from said first jaw and to move said fourth jaw away from said second jaw, said one slide having attached thereto a pair of filament-leg locating guides shaped and located to move the legs of a filament inwardly toward the centers of said first and second jaws when said one slide is moved to move said third jaw toward said first jaw, and said means engaging said slides comprising angled slots in said slides adjacent the opposite ends of said slides, a rotary vane in said slots and pivoted between said slots, and means for rotating said vane.

6. A filament conveyor having a relatively long, relatively narrow body, said body having at one end of one longitudinal side, a first filament-leg gripping jaw, and having adjacent the corresponding end of its opposite side, a second filament-leg gripping jaw spaced outwardly beyond said one end and facing the opposite end of said opposite side, a pair of slides slidable within said body, one of said slides having adjacent one end a third filament leg gripping jaw facing said first jaw, the other of said slides having at its end corresponding to said end of said one slide a fourth filament-leg gripping jaw facing said second jaw, and means engaging said slides for moving said one slide to move said third jaw toward said first jaw and for moving said fourth jaw toward said second jaw, or to move said third jaw away from said first jaw and to move said fourth jaw away from said second jaw, said one slide having attached thereto a pair of filament-leg locating guides shaped and located to move the legs of a filament inwardly toward the centers of said first and second jaws when said one slide is moved to move said third jaw toward said first jaw, and said means engaging said slides comprising angled slots in said slides adjacent the opposite ends of said slides, a rotary vane in said slots and pivoted between said slots, and means for rotating said vane, the pivot of said vane being located further from the slot in said one slide than from the slot in said other slide whereby said one slide is moved further by rotation of said vane and said other slide.

7. A filament conveyor having a relatively long, relatively narrow body, said body having at one end of one longitudinal side, a first filament-leg gripping jaw, and having adjacent the corresponding end of its opposite side, a second filament leg gripping jaw spaced outwardly beyond said one end and facing the opposite end of said opposite side, a pair of slides slidable within said body, one of said slides having adjacent one end a third filament-leg gripping jaw facing said first jaw, the other of said slides having at its end corresponding to said end of said one slide a fourth filament-leg gripping jaw facing said second jaw, and means engaging said slides for moving said one slide to move said third jaw toward said first jaw and for moving said fourth jaw toward said second jaw, or to move said third jaw away from said first jaw and to move said fourth jaw away from said second jaw, and said means engaging said slides comprising angled slots in said slides adjacent their opposite ends, a rotary vane in said slots, and means for rotating said vane.

8. A filament conveyor having a relatively long and relatively narrow body, said body being provided with a longitudinal slot therealong one longitudinal side, a side slide in said slot at said longitudinal side, a center slide in said slot between said side slide and the opposite longitudinal side of said body, said body being provided with a recess adjacent its inner end with which said slot connects, said slides having corresponding ends in said recess, said body having adjacent the outer end of said opposite longitudinal side a first jaw portion extending below the bottom of said body, said first jaw portion having a first flat filament-leg gripping jaw at its outer end, said body having adjacent the outer end of said one longitudinal side an outer portion under said center slide and extending longitudinally outwardly beyond said first jaw portion, said outer portion having a second jaw portion extending transversely outwardly beyond said one longitudinal side and extending below said bottom of said body, said second jaw portion having a second flat filament-leg gripping jaw spaced longitudinally of said body from said first jaw, said second jaw facing said inner end of said body, said center slide having at its outer end a third jaw portion extending transversely outwardly from the outer side of said center slide and extending below said bottom of said body, said third jaw portion having a third flat filament-leg gripping jaw along its inner end facing and aligned with said first jaw, said side slide having at its outer end a fourth jaw portion extending transversely outwardly from the outer side of said side slide and extending below said bottom of said body, said fourth jaw portion having at its outer end a fourth flat filament-leg gripping jaw facing and aligned with said second jaw, said slides being provided near said inner ends with slots extending thereacross at acute angles to their longitudinal sides, a rotary vane extending into said recess and into said slots in said slides, said vane being pivoted between said slots in said slides, and means for rotataing said vane for moving said slides.

9. A filament conveyor having a relatively long and relatively narrow body, said body being provided with a longitudinal slot therealong one longitudinal side, a side slide in said slot at said longitudinal side, a center slide in said slot between said side slide and the opposite longitudinal side of said body, said body being provided with a recess adjacent its inner end with which said slot connects, said slides having corresponding ends in said recess, said body having adjacent the outer end of said opposite longitudinal side a first jaw portion extending below the bottom of said body, said first jaw portion having a first flat filament-leg gripping jaw at its outer end, said body having adjacent the outer end of said one longitudinal side an outer portion under said center slide and extending longitudinally outwardly beyond said first jaw portion, said outer portion having a second jaw portion extending transversely outwardly beyond said one longitudinal side and extending below said bottom of said body, said second jaw portion having a second flat filament-leg gripping jaw spaced longitudinally of said body from said first jaw, said second jaw facing said inner end of said body, said center slide having at its outer end a third jaw portion extending transversely outwardly from the outer side of said center slide and extending below said bottom of said body, said third jaw portion having a third flat filament-leg gripping jaw along its inner end facing and aligned with said first jaw, said side slide having at its outer end a fourth jaw portion extending transversely outwardly from the outer side of said side slide and extending below said bottom of said body, said fourth jaw portion having at its outer end a fourth flat filament-leg gripping jaw facing and aligned with said second jaw, said slides being provided near said inner ends with slots extending thereacross at acute angles to their longitudinal sides, a rotary vane extending into said recess and into said slots in said slides and being pivoted between said slots in said slides, means for rotating said vane for moving said slides, and said body having spaced-apart portions extending below said bottom and forming a pair of aligned spaced-apart recesses having sides aligned substantially with said first and second jaws, for receiving the upper portion of the coiled body of a filament to be picked up by said conveyor.

10. A filament conveyor having a relatively long and relatively narrow body, said body being provided with a longitudinal slot therealong one longitudinal said, a side slide in said slot at said longitudinal side, a center slide in said slot between said side slide and the opposite longitudinal side of said body, said body being provided with a recess adjacent its inner end with which said slot connects, said slides having corresponding ends in said recess, said body having adjacent the outer end of said opposite longitudinal side a first jaw portion extending below the bottom of said body, said first jaw portion having a first flat filament-leg gripping jaw at its outer end, said body having adjacent the outer end of said one longitudinal side an outer portion under said center slide and extending longitudinally outwardly beyond said first jaw portion, said outer portion having a second jaw portion extending transversely outwardly beyond said one longitudinal side and extending below said bottom of said body, said second jaw portion having a second flat filament-leg gripping jaw spaced longitudinally of said body from said first jaw, said second jaw facing said inner end of said body, said center slide having at its outer end a third jaw portion extending transversely outwardly from the outer side of said center slide and extending below said bottom of said body, said third jaw portion having a third flat filament-leg gripping jaw along its inner end facing and aligned with said first jaw, said side slide having at its outer end a fourth jaw portion extending transversely outwardly from the outer side of said side slide and extending below said bottom of said body, said fourth jaw portion having at its outer end a fourth flat filament-leg gripping jaw facing and aligned with said second jaw, said slides being provided near said inner ends with slots extending thereacross at acute angles to their longitudinal sides, a rotary vane extending into said recess and into said slots in said slides and being pivoted between said slots in said slides, means for rotating said vane for moving said slides, said body having spaced-apart portions extending below said bottom and forming a pair of aligned spaced-apart recesses having sides aligned substantially with said first and second jaws, for receiving the upper portion of the coiled body of a filament to be picked up by said conveyor, and said center slide having at the outer end of its inner side a portion extending transversely outwardly from said inner side and extending below said bottom of said body, in which a filament leg locating guide is on said last mentioned portion, and in which another filament-leg locating guide is on said third jaw portion, said guides being located and shaped to guide the legs of a filament toward the centers of said jaws when said slides are moved by said vane to cause said third and fourth jaws to approach said first and second jaws respectively.

11. A filament conveyor having a relatively long and relatively narrow body, said body being provided with a longitudinal slot therealong one longitudinal side, a side slide in said slot at said longitudinal side, a center slide in said slot between said side slide and the opposite longitudinal side of said body, said body being provided with a recess adjacent its inner end with which said slot connects, said slides having corresponding ends in said recess, said body having adjacent the outer end of said opposite longitudinal side a first jaw portion extending below the bottom of said body, said first jaw portion having a first flat filament-leg gripping jaw at its outer end, said body having adjacent the outer end of said one longitudinal side an outer portion under said center slide and extending longitudinally outwardly beyond said first jaw portion, said outer portion having a second jaw portion extending transversely outwardly beyond said one longitudinal side and extending below said bottom of said body, said second jaw portion having a second flat filament-leg gripping jaw spaced longitudinally of said body from said first jaw, said second jaw facing said inner end of said body, said center slide having at its outer end a third jaw portion extending transversely outwardly from the outer side of said center slide and extending below said bottom of said body, said third jaw portion having a third flat filament-leg gripping jaw along its inner end facing and aligned with said first jaw, said side slide having at its outer end a fourth jaw portion extending transversely outwardly from the outer side of said side slide and extending below said bottom of said body, said fourth jaw portion having at its outer end a fourth flat filament-leg gripping jaw facing and aligned with said second jaw, said slides being provided near said inner ends with slots extending thereacross at acute angles to their longitudinal sides, a rotary vane extending into said recess and into said slots in said slides and being pivoted between said slots in said slides, means for rotating said vane for moving said slides, said center slide having at the outer end of its inner side a portion extending transversely outwardly from said inner side and extending below said bottom of said body, in which a filament-leg locating guide is provided on said last mentioned portion, in which another filament leg locating guide is provided on said third jaw portion, and said guides being located and shaped to guide the legs of a filament toward the centers of said jaws when said slides are moved by said vane to cause said third and fourth jaws to approach said first and second jaws respectively.

12. A filament conveyor having a relatively long and relatively narrow body, said body being provided with a longitudinal slot therealong one longitudinal side, a side slide in said slot at said longitudinal side, a center slide in said slot between said side slide and the opposite longitudinal side of said body, said body being provided with a recess adjacent its inner end with which said slot connects, said slides having corresponding ends in said recess, said body having adjacent the outer end of said opposite longitudinal side a first jaw portion extending below the bottom of said body, said first jaw portion having a first flat filament-leg gripping jaw at its outer end, said body having adjacent the outer end of said one longitudinal side an outer portion under said center slide and extending longitudinally outwardly beyond said first jaw portion, said outer portion having a second jaw portion extending transversely outwardly beyond said one longitudinal side and extending below said bottom of said body, said second jaw portion having a second flat filament-leg gripping jaw spaced longitudinally of said body from said first jaw, said second jaw facing said inner end of said body, said center slide having at its outer end a third jaw portion extending transversely outwardly from the outer side of said center slide and extending below said bottom of said body, said third jaw portion having a third flat filament-leg gripping jaw along its inner end facing and aligned with said first jaw, said side slide having at its outer end a fourth jaw portion extending transversely outwardly from the outer side of said side slide and extending below said bottom of said body, said fourth jaw portion having at its outer end a fourth flat filament-leg gripping jaw facing and aligned with said second jaw, said slides being provided near said inner ends with slots extending thereacross at acute angles to their longitudinal sides, a rotary vane extending into said recess and into said slots in said slides and being pivoted between said slots in said slides, and means for rotating said vane for moving said slides, said center slide having at the outer end of its inner side a portion extending transversely outwardly from said inner side and extending below said bottom of said body, and provided with a filament-leg locating guide on said last mentioned portion, another filament-leg locating guide provided on said third jaw portion, said guides being located and shaped to guide the legs of a filament towards the centers of said jaws when said slides are moved by said vane to cause said third and fourth jaws to approach said first and second jaws respectively, and the pivot of said vane being located further from said slot in said center slide than from said slot in said side slide whereby said center slide is moved further by rotation of said vane than said side slide.

13. A filament conveyor having a relatively long and relatively narrow body, said body being provided with a longitudinal slot therealong one longitudinal side, a side slide in said slot at said longitudinal side, a center slide in said slot between said side slide and the opposite longitudinal side of said body, said body being provided with a recess adjacent its inner end with which said slot connects, said slides having corresponding ends in said recess, said body having adjacent the outer end of said opposite longitudinal side a first jaw portion extending below the bottom of said body, said first jaw portion having a first flat filament-leg gripping jaw at its outer end, said body having adjacent the outer end of said one longitudinal side an outer portion under said center slide and extending longitudinally outwardly beyond said first jaw portion, said outer portion having a second jaw portion extending transversely outwardly beyond said one longitudinal side and extending below said bottom of said body, said second jaw portion having a second flat filament-leg gripping jaw spaced longitudinally of said body from said first jaw, said second jaw facing said inner end of said body, said center slide having at its outer end a third jaw portion extending transversely outwardly from the outer side of said center slide and extending below said bottom of said body, said third jaw portion having a third flat filament-leg gripping jaw along its inner end facing and aligned with said first jaw, said side slide having at its outer end a fourth jaw portion extending transversely outwardly from the outer side of said side slide and extending below the bottom of said body, said fourth jaw portion having at its outer end a fourth flat filament-leg gripping jaw facing and aligned with said second jaw, said slides being provided near said inner ends with slots extending thereacross at acute angles to their longitudinal sides, a rotary vane extending into said recess and into said slots in said slides and being pivoted between said slots in said slides, means for rotating said vane for moving said slides, said center slide having at the outer end of its inner side a portion extending transversely outwardly from said inner side and extending below said bottom of said body and provided with a filament-leg locating guide on said last mentioned portion, another filament-leg locating guide provided on said third jaw portion, and said guides being located and shaped to guide the legs of a filament toward the centers of said jaws when said slides are moved by said vane to cause said third and fourth jaws to approach said first and second jaws respectively, and in which the pivot of said vane is located further from said slot in said center slide than from said slot in said side slide whereby said center slide is moved further by rotation of said vane than said side slide.

References Cited in the file of this patent

UNITED STATES PATENTS

| | | |
|---|---|---|
| 592,199 | Fletcher | Oct. 19, 1897 |
| 2,297,950 | Flaws | Oct. 6, 1942 |
| 2,364,689 | Brooks | Dec. 12, 1944 |